2 Sheets—Sheet 1.
L. MYERS.
HORSE HAY-RAKE.
No. 7,599. Reissued April 10, 1877.
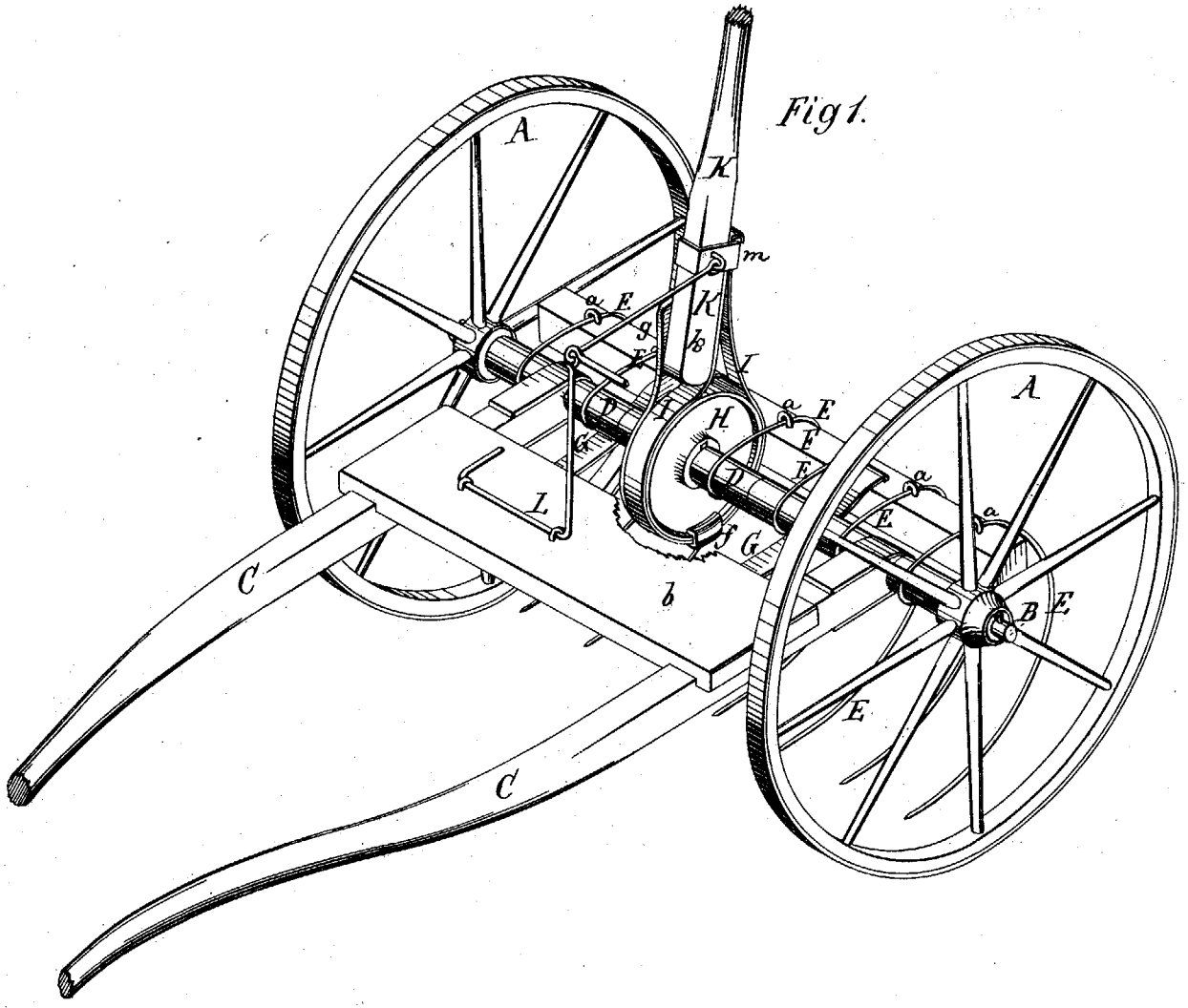
Witnesses:
Jno S. Slater
W. E. Chaffee
Inventor:
Lorenzo Myers
by Fenwick & Hammer
Mason Attys
N. PETERS, PHOTO-LITHOGRAPHER, WASHINGTON, D. C.

2 Sheets—Sheet 2.
L. MYERS.
HORSE HAY-RAKE.
No. 7,599. Reissued April 10, 1877.
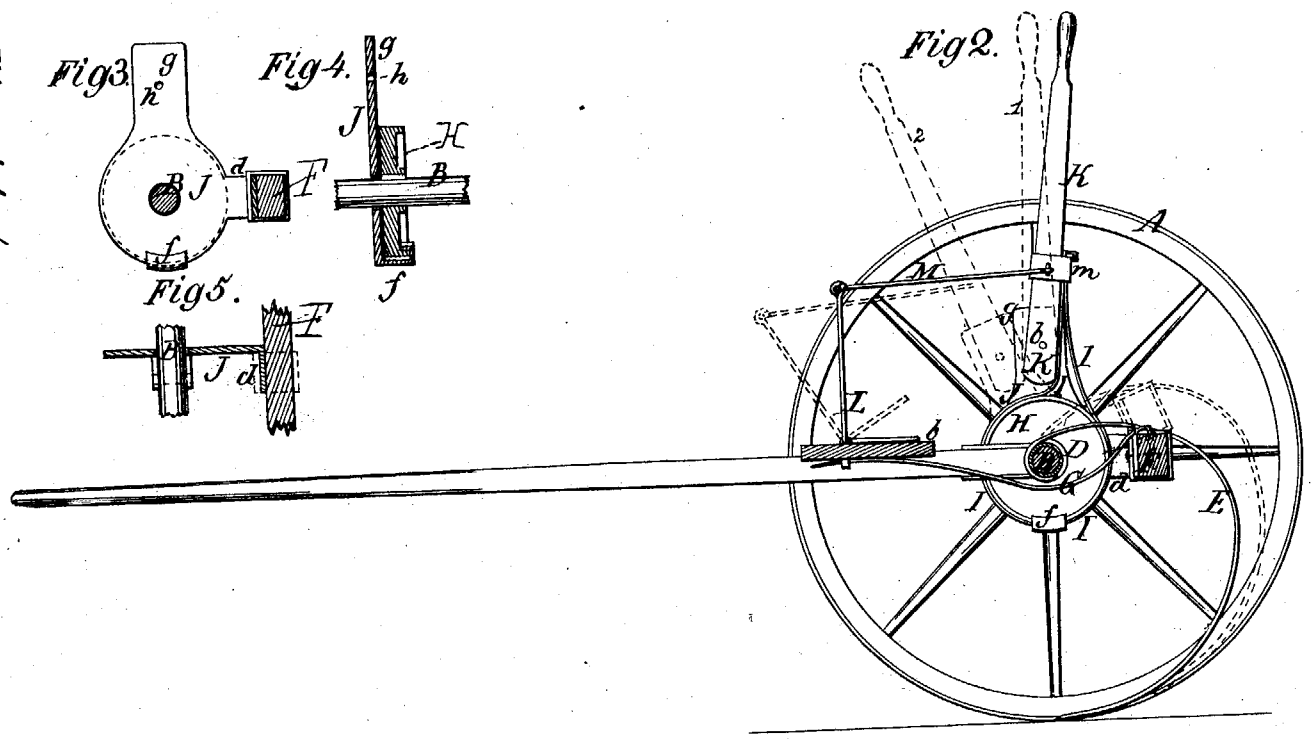
Witnesses:
Jno. S. Slater
W. E. Schaffer
Inventor:
Lorenzo Myers
by
Mason Fenwick & Lawrence
Attys.
N. PETERS, PHOTO-LITHOGRAPHER, WASHINGTON, D. C.

UNITED STATES PATENT OFFICE.

LORENZO MYERS, OF LUDLOWVILLE, NEW YORK.

IMPROVEMENT IN HORSE HAY-RAKES.

Specification forming part of Letters Patent No. 105,117, dated July 5, 1870; antedated June 28, 1870; reissue No. 7,599, dated April 10, 1877; application filed November 30, 1875.

*To all whom it may concern:*

Be it known that I, LORENZO MYERS, of Ludlowville, in the county of Tompkins and State of New York, have invented certain new and useful Improvements in Horse Hay-Rakes; and I do hereby declare the following to be a full, clear, and exact description thereof, reference being had to the accompanying drawings, making part of this specification, in which—

Figure 1 is a perpective view of my invention as applied to a horse hay-rake. Fig. 2 is a longitudinal section of the same. Figs. 3, 4, and 5 are sectional views, showing parts of my invention in detail.

My invention relates to that class of horse hay-rakes in which the discharge of the load is effected by the forward movement of the team; and consists in the employment of a revolving axle and a frictional griping device for communicating the rotary motion of said axle to the rake-teeth for the purpose of discharging the load.

In the accompanying drawings, A represents the wheels on which the machine is transported, one of which is secured to the axle B in such a manner as to cause the rotation of the latter by the forward movement of said wheel. The teeth are attached to thimbles placed loosely upon the axle, and the friction wheel or drum H is secured firmly to the axle in such a manner as to rotate with the forward revolution of said axle. This wheel constitutes in effect an enlargement of the axle B, to which it is secured, and its purpose is simply to give increased surface for the strap I. In other respects the result is the same as if the strap were applied directly to the axle.

The disk or flange J has a central perforation, and is placed on the axle B by the side of the fixed wheel H, the axle revolving freely within it. A stud, *d*, extends to the rear, and is fixed to the staple-bar F. To a stud or projection, *g*, on the upper side of the said disk or flange, is pivoted the lever K at *h*. Around the friction-wheel H there is fitted a band or strap, I, the ends of which are attached to the said lever K.

It will be seen that the strap I encircles the wheel H, and causes a balancing-pressure, or nearly so, to be brought upon opposite sides of the axle B, and thus permits a great pressure to be brought against the revolving surface, with little or no tendency to bend the axle out of its proper working position, and also makes it possible to reduce the weight, and, consequently, the cost, below a point that could be reached if the pressure were brought to bear against one side of the revolving axle only.

The bracket *f* is a part of the disk or flange J, and extends around the strap I, and to the opposite side of the wheel H, and is the means of holding these parts together, while, at the same time, it allows the wheel H to revolve freely within the strap and flange or disk.

The thills C are attached to the axle B by means of straps partially encircling the latter, and through which said axle is free to revolve. In front of the axle B there is secured to the thills a cross-bar or foot-board, *b*, to which the foot-lever L is secured by means of staples.

To the said foot-lever is attached a rod, M, which connects it with the hand-lever K, to which the said rod is also attached at a point above the pivot *h*.

Operation: The friction-wheel H and axle B are connected with the wheel A in such a manner as to rotate with the forward movement of the latter, as aforesaid. When it is desired to discharge the rake it is only necessary to move the lever K forward by the hand, or by means of the foot-lever L, which causes the strap I to gripe the wheel H, and thus to lock the revolving axle to the disk or flange, thereby connecting it with the teeth E, and causing the latter to partake of the rotary motion of the former, and thus discharge the load.

Having described my invention, what I claim as new, and desire to secure by Letters Patent, is—

1. The combination of a revolving axle and rake-teeth, and a flexible friction-gripe for gearing them together, for the purpose set forth.

2. A friction-surface applied on opposite sides of a revolving axle, in combination with the rake-teeth, for the purpose of gearing the teeth with the axle, substantially as set forth.

3. The combination of the wheel H fixed to the axle, the disk or flange J, with its studs *g* and *d*, the lever K, strap I, and the staple-bar F, substantially as set forth.

4. In a hay-rake, in combination with the revolving axle and with the lifting-bar for raising the teeth, a friction-strap having connections with the bar and with mechanism by which it is caused to bite the rotating surface at will.

LORENZO MYERS.

Witnesses:
CHS. G. DAY,
WM. H. FIELD.